(12) United States Patent
Lee et al.

(10) Patent No.: US 11,111,965 B2
(45) Date of Patent: Sep. 7, 2021

(54) CLUTCH UNIT FOR AUTOMATIC TRANSMISSION

(71) Applicants: Hyundai Motor Company, Seoul (KR); Kia Motors Corporation, Seoul (KR)

(72) Inventors: Kang Hoon Lee, Goyang-Si (KR); Sung Hoon Park, Seongnam-Si (KR); Jae Young Jeon, Osan-Si (KR); Wonseok Oh, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 23 days.

(21) Appl. No.: 16/854,705

(22) Filed: Apr. 21, 2020

(65) Prior Publication Data
US 2021/0207661 A1 Jul. 8, 2021

(30) Foreign Application Priority Data
Jan. 8, 2020 (KR) .......................... 10-2020-0002685

(51) Int. Cl.
| | |
|---|---|
| *F16D 13/52* | (2006.01) |
| *F16D 25/0638* | (2006.01) |
| *F16H 63/30* | (2006.01) |
| *F16D 25/08* | (2006.01) |

(52) U.S. Cl.
CPC ......... *F16D 13/52* (2013.01); *F16D 25/0638* (2013.01); *F16D 25/082* (2013.01); *F16H 63/3026* (2013.01)

(58) Field of Classification Search
CPC .............................. F16D 13/52; F16D 25/082
See application file for complete search history.

(56) References Cited

U.S. PATENT DOCUMENTS

| | | | | |
|---|---|---|---|---|
| 5,876,300 | A * | 3/1999 | Moroto | F16H 3/66 475/275 |
| 2005/0082135 | A1* | 4/2005 | Arai | F16D 48/02 192/35 |
| 2015/0267760 | A1* | 9/2015 | Hemphill | F16C 19/30 192/70.11 |
| 2016/0097430 | A1* | 4/2016 | Imafuku | F16D 28/00 192/18 B |

(Continued)

*Primary Examiner* — Stacey A Fluhart
(74) *Attorney, Agent, or Firm* — Morgan, Lewis & Bockius LLP

(57) ABSTRACT

A clutch unit of an automatic transmission having first and second rotation elements may include a spline gear connected to the first rotation element, a clutch drum having an internal circumference spline-engaged with the spline gear to be movable in an axial direction, a clutch hub fixedly connected to a second rotation element, a plurality of clutch plates spline-engaged with the clutch drum, a plurality of clutch disks alternatingly disposed between the plurality of clutch plates and spline-engaged with the clutch hub, a supporting portion fixed to a transmission housing of the automatic transmission and configured to support the plurality of clutch plates, and a piston disposed in an interior of the transmission housing to form a hydraulic pressure chamber with the transmission housing, configured to have a rolling contact with the clutch drum interposing a bearing, and configured to transmit a pressurizing force to the plurality of clutch plates and the clutch disks through the clutch drum.

13 Claims, 2 Drawing Sheets

(56) References Cited

U.S. PATENT DOCUMENTS

2016/0223032 A1\* 8/2016 Fujinuma .............. F16D 25/083
2016/0281799 A1\* 9/2016 Gilmore ................ F16D 25/082
2017/0016491 A1\* 1/2017 Carr ........................ F16C 19/30
2018/0355929 A1\* 12/2018 Nozu ................. B60K 17/3515

\* cited by examiner

CLUTCH UNIT FOR AUTOMATIC TRANSMISSION

CROSS-REFERENCE TO RELATED APPLICATION

The present application claims priority to Korean Patent Application No. 10-2020-0002685 filed on Jan. 8, 2020, the entire contents of which is incorporated herein for all purposes by this reference.

BACKGROUND OF THE INVENTION

Field of the Invention

The present invention relates to a clutch unit for an automatic transmission.

Description of Related Art

An environment-friendly technology of a vehicle is a core technology which controls survival of a future vehicle industry, and advanced vehicle makers have focused their energy on the development of an environment-friendly vehicle to achieve environmental and fuel efficiency regulations.

For enhancing fuel consumption, a high efficiency engine, various approaches, such as a high efficiency transmission, a light-weight vehicle body, etc. are under investigation, and in in the transmission field, a double clutch transmission and an automated manual transmission are also under research to compromise efficiency of a manual transmission and convenience of an automatic transmission.

Such a transmission transfers a torque of an engine by engagement and disengagement of dry or wet-type clutches between rotation elements of planetary gear sets. In the case of a wet-type clutch, a plurality of clutch plates and a plurality of clutch disks are alternatingly disposed between and spline-engaged with a clutch drum and a clutch hub connected to rotation elements of the planetary gear sets.

In a disengaged state of such a wet-type clutch, the clutch plates and the clutch disks may relative rotate such that the clutch drum and the clutch hub may rotate at respective rotation speeds. In an engaged state, a hydraulically operated piston pressurizes the clutch plate and the clutch disks, and by a frictional force induced thereby, the clutch drum and the clutch hub rotate at a same speed, forcing rotation elements connected thereto to rotate at the same speed.

In such a conventional clutch unit, a piston is positioned in a retainer connected to the clutch drum and forms a hydraulic pressure chamber with the retainer, rotating together with the retainer. In the instant case, since the hydraulic pressure is supplied through the rotating retainer, a hydraulic line may be provided between the piston and the retainer, e.g., through sleeves and sealing, and to compensate a centrifugal hydraulic pressure generated by the rotation of the piston and the retainer, a balance chamber is typically formed in the hydraulic pressure chamber by employing a balance piston.

Such a conventional clutch unit has a limitation in shortening the transmission length due to constituent elements such as the hydraulic pressure chamber, the balance chamber, and the balance piston, which may be an obstacle in application for an electric vehicle, such as a hybrid electric vehicle.

The information included in the present Background of the present invention section is only for enhancement of understanding of the general background of the present invention and may not be taken as an acknowledgement or any form of suggestion that the present information forms the prior art already known to a person skilled in the art.

BRIEF SUMMARY

Various aspects of the present invention are directed to providing a clutch unit for an automatic transmission having first and second rotation elements having a spline gear fixedly connected to the first rotation element and including spline teeth at an external circumference, a clutch drum having an internal circumference spline-engaged with the spline teeth of the spline gear to be movable in an axial direction, a clutch hub fixedly connected to a second rotation element, a plurality of clutch plates spline-engaged with an internal circumference of the clutch drum, a plurality of clutch disks alternatingly disposed between the plurality of clutch plates and spline-engaged with an external circumference of the clutch hub, a supporting portion fixed to a transmission housing of the automatic transmission and having an end portion to support the plurality of clutch plates, and a piston disposed in an interior of the transmission housing to form a hydraulic pressure chamber with the transmission housing, configured to have a rolling contact with the clutch drum interposing a bearing, and configured to transmit a pressurizing force to the clutch plates and the clutch disks through the clutch drum.

A bearing may be located between the transmission housing and the spline gear.

The clutch drum may include a pressurizing surface that pressurizes the plurality of clutch plates along the axial direction thereof.

The exemplary clutch unit may further include a plurality of wave springs each being disposed between an adjacent pair of the clutch plates to provide a restoring force.

A bearing may be located between the supporting portion and the plurality of clutch plates.

At least one sealing may be disposed between the transmission housing and the piston so that the hydraulic pressure chamber is closed and sealed by the at least one sealing member.

According to an exemplary embodiment of the present invention, a clutch drum is spline-engaged on the spline gear fixed to first rotation element to be movable in the axial direction, friction members are supported by a supporting portion fixed to a transmission housing of the automatic transmission, and in the present state, a pressurizing force of the piston is transferred to the clutch drum. Therefore, a rotation piston is not required to be separately further employed, and thereby a length of a transmission may be decreased.

Furthermore, a hydraulic pressure chamber is formed at a transmission housing by the piston 23 such that the piston does not rotate with respect to the transmission housing. Therefore, a centrifugal hydraulic pressure which may be caused by a rotating piston may be prevented, and accordingly, constituent elements, such as a balance chamber and a balance piston, to compensate the centrifugal hydraulic pressure may become unnecessary, decreasing an overall length of the transmission.

Furthermore, a hydraulic pressure chamber may be formed as a closed-type hydraulic pressure chamber in the transmission housing to realize a closed-type hydraulic pressure system, and therefore, a loss in power and fluid by a fluid leakage may be minimized Furthermore, a wave spring is interposed each adjacent pair of clutch plates to provide a restoring force therebetween, a gap between friction members may be rapidly formed and stably maintained for a disengaged state, minimizing a drag loss of friction members.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
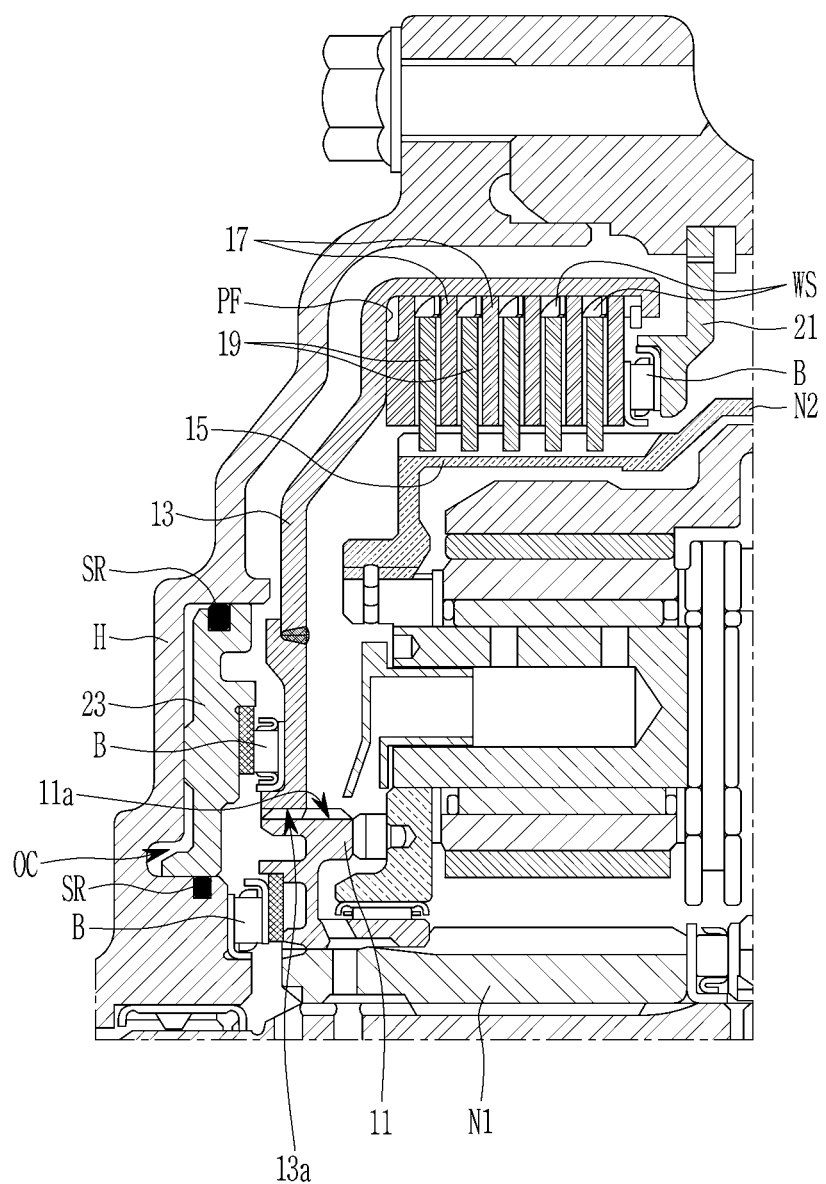
FIG. 1 is cross-sectional view of a clutch unit of an automatic transmission according to an exemplary embodiment.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in portion by the intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments, it will be understood that the present description is not intended to limit the present invention(s) to those exemplary embodiments. On the other hand, the present invention(s) is/are intended to cover not only the exemplary embodiments, but also various alternatives, modifications, equivalents and other embodiments, which may be included within the spirit and scope of the present invention as defined by the appended claims.

Hereinafter, an exemplary embodiment of the present invention will be described in detail with reference to the accompanying drawings.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is cross-sectional view of a clutch unit of an automatic transmission according to an exemplary embodiment.

A wet-type clutch unit applicable between rotation elements is taken as an example for a detail description of a clutch unit of an automatic transmission according to an exemplary embodiment.

The exemplary clutch apparatus is provided to transmit a torque between rotation elements, and in an exemplary embodiment of the present invention, may be disposed between a first rotation element N1 and a second rotation element N2 of a planetary gear set.

As may be obviously understood, a planetary gear set may include three rotation elements of a sun gear, a planet carrier, and a ring gear, where the planet carrier supports a plurality of pinion gears externally engaged with the sun gear, the ring gear is internally engaged with plurality of pinion gears.

An exemplary clutch apparatus may be disposed between such rotation elements of one or more planetary gear sets, and may be disposed between a rotation shaft, e.g., an input shaft, output shaft, and the like, and a rotation element of a planetary gear set. That is, any two rotation members may be applied with the exemplary clutch apparatus, and such rotation members including rotation shafts and rotation elements of a planetary gear set may be applied with the exemplary clutch apparatus.

Referring to FIG. 1, a clutch unit employed in an exemplary embodiment includes a spline gear 11, a clutch drum 13, a clutch hub 15, a friction member set having a plurality of clutch plates 17 and a plurality of clutch disks 19, a supporting portion 21, and a piston 23.

The spline gear 11 is fixedly connected to a first rotation element N1, e.g., a rotation shaft (such as an input shaft or an output shaft) or a rotation element of a planetary gear set, and spline teeth 11a are formed on an external circumference of the spline gear 11.

The spline gear 11 is supported in an axial direction by a transmission housing H interposing a bearing B.

The clutch drum 13 of formed with spline teeth 13a on an internal circumference of the clutch drum 13, and the spline teeth 13a are spline-engaged with the spline teeth 11 formed on the external circumference of the spline gear 11, such that the clutch drum 13 may be slidable along the axial direction thereof.

The clutch drum 13 contacts with the plurality of clutch plates 17 on an internal circumference of the clutch drum 13. The clutch drum 13 includes a flat pressurizing surface PF pressurizing the plurality of clutch plates 17 along the axial direction thereof.

The clutch hub 15 is fixedly connected to a second rotation element N2, e.g., a rotation shaft (such as an input shaft or an output shaft) or a rotation element of a planetary gear set.

The plurality of clutch plates 17 are spline-engaged with the internal circumference of the clutch drum 13. The plurality of clutch disks 19 are spline-engaged with an external circumference of the clutch hub 15, while being alternatingly disposed between the plurality of clutch plates 17.

A wave spring WS is disposed between each adjacent pair of clutch plates 17 and applies a restoring force to maintain a gap between the adjacent pair of clutch plates 17.

The supporting portion 21 includes an external circumference fixed to the transmission housing H, and an internal end portion in rolling contact with the clutch plates 19 along the axial direction thereof.

For the rolling contact between the supporting portion 21 and the clutch plates 17, a bearing B is located between the supporting portion 21 and the clutch plates 17.

The piston 23 is disposed in an interior of the transmission housing H and forms a hydraulic pressure chamber OC with the transmission housing H. That is, the piston 23 is not rotating but reciprocating with respect to the transmission housing H. The piston 23 forms a rolling contact with external surface of the clutch drum 13 interposing a bearing B, and provides a pressurizing force to the clutch plates 17 and the clutch disks 19 through the clutch drum 13.

Here, sealing SR is disposed between the transmission housing H and the piston 23 such that the hydraulic pressure chamber OC may be closed and sealed by the piston 23.

Figure 2:
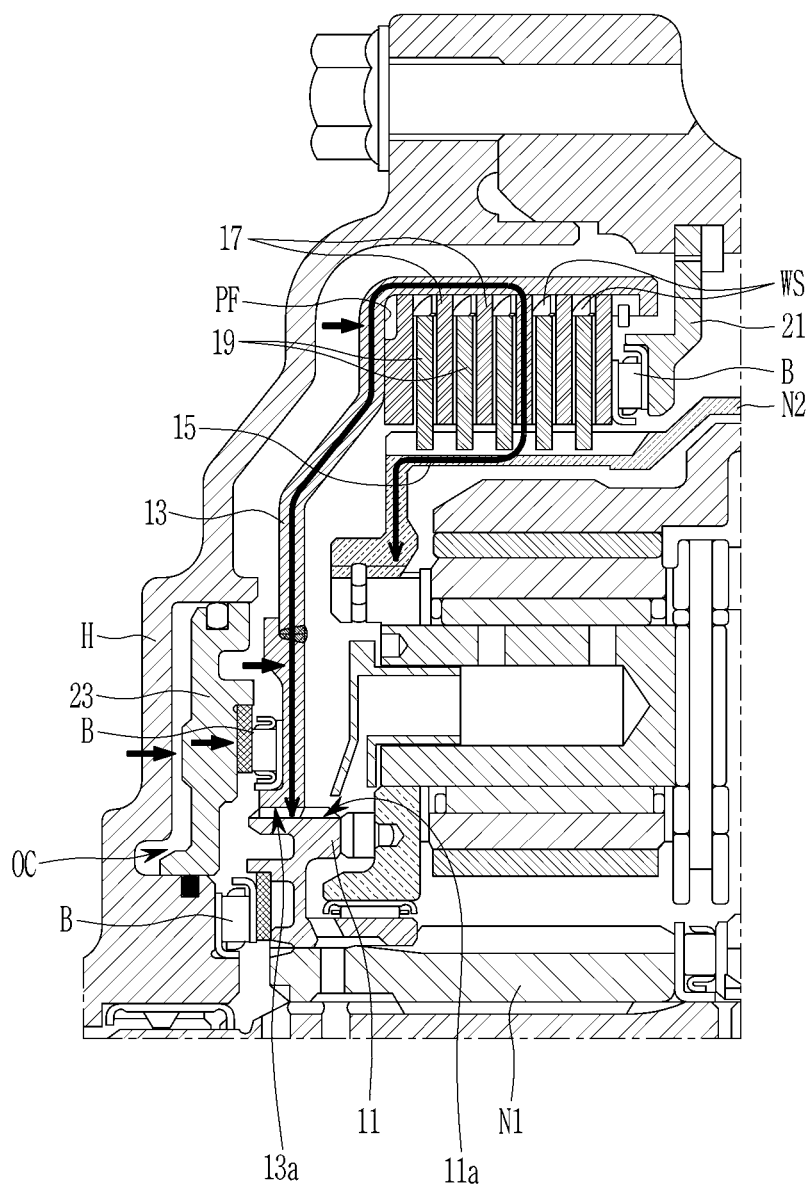
FIG. 2 is a cross-sectional view in an operation state of a clutch unit of an automatic transmission according to an exemplary embodiment.

FIG. 2 is a cross-sectional view in an operation state of a clutch unit of an automatic transmission according to an exemplary embodiment.

An operation of such a clutch apparatus as an exemplary power transmission apparatus is hereinafter described in detail with reference to FIG. 2.

Referring to FIG. 2, the clutch drum 13 is connected to the first rotation element N1 through the spline gear 11 to communicate a torque, and the clutch hub 15 is connected to the second rotation element to communicate a torque.

In the present state, when a hydraulic pressure is supplied to the hydraulic pressure chamber OC to operate the clutch unit, the piston 23 pushes and thereby provides a pressurizing force to the clutch drum 13 along the axial direction thereof.

Accordingly, the clutch drum 13 pressurizes the plurality of clutch plates 17 along the axial direction by the pressurizing surface PF by being rebutted by the supporting portion 21, a plurality of clutch plates 17 and a plurality of clutch disks 19 are tightly pressed to form an engagement force therebetween.

Therefore, the engagement force of the friction member set of the clutch plates 17 and the clutch disks 19 enables torque transmission between the clutch drum 13 and the clutch hub 15, and accordingly, between the first and second rotation elements N1 and N2.

According to a clutch unit of an automatic transmission according to an exemplary embodiment of the present invention, the clutch drum 13 is spline-engaged on the spline gear 11 fixed to first rotation element to be movable in the axial direction, friction members of the clutch plates 17 and the clutch disks 19 are supported by a supporting portion 21 fixed to the transmission housing 1, and in the present state, a pressurizing force of the piston 23 is transferred to the clutch drum 13. Therefore, a rotation piston rotating together with the clutch drum 13 is not required to be separately further employed, and thereby a length of a transmission may be decreased.

Furthermore, the hydraulic pressure chamber OC is formed at the transmission housing H by the piston 23 such that the piston 23 does not rotate with respect to the transmission housing H. Therefore, a centrifugal hydraulic pressure which may be caused by a rotating piston may be prevented, and accordingly, constituent elements, such as a balance chamber and a balance piston, to compensate the centrifugal hydraulic pressure may become unnecessary, decreasing an overall length of the transmission.

Furthermore, the hydraulic pressure chamber OC is formed as a closed-type hydraulic pressure chamber in the transmission housing H to realize a closed-type hydraulic pressure system, and therefore, a loss in power and fluid by a fluid leakage may be minimized Furthermore, the wave spring WS is interposed each adjacent pair of clutch plates 17 to provide a restoring force therebetween, a gap between friction members may be rapidly formed and stably maintained for a disengaged state, minimizing a drag loss of friction members.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A clutch unit for an automatic transmission having a first rotation element and a second rotation element, the clutch unit comprising:
   a spline gear fixedly connected to the first rotation element and including spline teeth at an external circumference of the spline gear;
   a clutch drum having an internal circumference spline-engaged with the spline teeth of the spline gear to be movable in an axial direction of the clutch drum;
   a clutch hub fixedly connected to the second rotation element;
   a plurality of clutch plates spline-engaged with an internal circumference of the clutch drum;
   a plurality of clutch disks alternatingly mounted between the plurality of clutch plates and spline-engaged with an external circumference of the clutch hub;
   a supporting portion fixed to a transmission housing of the automatic transmission and having an end portion to support the plurality of clutch plates; and
   a piston mounted in an interior of the transmission housing to form a hydraulic pressure chamber with the transmission housing, configured to have a rolling contact with the clutch drum in which a first bearing is mounted between the piston and the clutch drum, and configured to transmit a pressurizing force to the plurality of clutch plates and the clutch disks through the clutch drum.

2. The clutch unit of claim 1, wherein a second bearing is mounted between the transmission housing and the spline gear.

3. The clutch unit of claim 1, wherein the clutch drum includes a pressurizing surface that pressurizes the plurality of clutch plates along the axial direction thereof.

4. The clutch unit of claim 1, further including a plurality of wave elastic members each being mounted between an adjacent pair of the plurality of clutch plates to provide a restoring force.

5. The clutch unit of claim 1, wherein a third bearing is mounted between the supporting portion and the plurality of clutch plates.

6. The clutch unit of claim 1, wherein at least one sealing member is mounted between the transmission housing and the piston so that the hydraulic pressure chamber is closed and sealed by the at least one sealing member.

7. A clutch unit of an automatic transmission, the clutch unit comprising:
   a clutch drum connected to a first rotation element of the automatic transmission;

a clutch hub connected to a second rotation element of the automatic transmission;

a friction member set mounted between the clutch drum and the clutch hub;

a piston pressurizing the friction member set by a hydraulic pressure, wherein the clutch drum is spline-engaged with a spline gear fixedly connected to the first rotation element, to be movable in an axial direction of the clutch drum, and is configured to pressurize the friction member set in the axial direction, wherein the friction member set is rolling-supported in the axial direction by a supporting portion fixed to a transmission housing of the automatic transmission, and wherein the piston mounted in an interior of the transmission housing to form a hydraulic pressure chamber with the transmission housing without relatively rotating with respect to the transmission housing has a rolling contact with the clutch drum.

8. The clutch unit of claim 7, wherein the friction member set includes:

a plurality of clutch plates spline-engaged with an internal circumference of the clutch drum; and a plurality of clutch disks alternatingly mounted between the plurality of clutch plates and spline-engaged with an external circumference of the clutch hub.

9. The clutch unit of claim 8, further including a plurality of wave elastic members each being mounted between an adjacent pair of clutch plates.

10. The clutch unit of claim 8, wherein a first bearing is mounted between the supporting portion and the plurality of clutch plates.

11. The clutch of claim 7, wherein a second bearing is mounted between the transmission housing and the spline gear.

12. The clutch of claim 7, wherein a third bearing is mounted between the piston and the clutch drum.

13. The clutch unit of claim 7, wherein at least one sealing member is mounted between the transmission housing and the piston so that the hydraulic pressure chamber is closed and sealed by the at least one sealing member.

* * * * *